United States Patent
Jackson et al.

(10) Patent No.: US 8,640,033 B2
(45) Date of Patent: Jan. 28, 2014

(54) UNIFIED USER EXPERIENCE USING CONTEXTUAL INFORMATION, DATA ATTRIBUTES AND DATA MODELS

(75) Inventors: Bradley Scott Jackson, Snoqualmie, WA (US); Thomas F. Theiner, Sammamish, WA (US); Evgueni N. Bykov, Kenmore, WA (US); Vitaly V. Filimonov, Bothell, WA (US); Marisol Ontaneda, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1153 days.

(21) Appl. No.: 11/771,832

(22) Filed: Jun. 29, 2007

(65) Prior Publication Data

US 2009/0006954 A1 Jan. 1, 2009

(51) Int. Cl.
  *G06F 3/00* (2006.01)
  *H04J 3/06* (2006.01)
  *G06F 3/01* (2006.01)
  *G06F 3/048* (2013.01)

(52) U.S. Cl.
  CPC . *G06F 3/01* (2013.01); *G06F 3/048* (2013.01); *Y10S 715/968* (2013.01)
  USPC ........... 715/738; 715/853; 715/859; 715/968; 370/509

(58) Field of Classification Search
  CPC .................................. G06F 3/01; G06F 3/048
  USPC .................... 715/853, 859, 968, 738; 370/509
  See application file for complete search history.

(56) References Cited

U.S. PATENT DOCUMENTS

| | | | |
|---|---|---|---|
| 5,740,429 A | | 4/1998 | Wang et al. |
| 6,714,979 B1 | | 3/2004 | Brandt et al. |
| 6,823,334 B2 | * | 11/2004 | Vishnubhotla et al. ............... 1/1 |
| 6,885,641 B1 | * | 4/2005 | Chan et al. .................... 370/252 |
| 7,089,231 B2 | * | 8/2006 | Hirata et al. ........................... 1/1 |
| 7,143,099 B2 | | 11/2006 | Lecheler-Moore et al. |
| 7,165,044 B1 | * | 1/2007 | Chaffee .......................... 705/37 |
| 7,250,951 B1 | * | 7/2007 | Hurley et al. ................. 345/440 |
| 7,283,971 B1 | * | 10/2007 | Levine et al. ................. 705/7.13 |
| 7,634,511 B1 | * | 12/2009 | Freiheit et al. ........................ 1/1 |
| 7,650,198 B2 | * | 1/2010 | Dorgelo et al. .............. 700/108 |
| 7,962,806 B2 | * | 6/2011 | Kotrla et al. .................. 714/704 |
| 8,140,920 B2 | * | 3/2012 | Kotrla et al. .................. 714/712 |
| 8,340,067 B2 | * | 12/2012 | Buga et al. .................... 370/338 |

(Continued)

FOREIGN PATENT DOCUMENTS

| | | | | |
|---|---|---|---|---|
| WO | | 0135256 A2 | 5/2001 | |
| WO | WO 2008003033 A2 | * | 1/2008 | ............. G01R 19/25 |

OTHER PUBLICATIONS

"Investigative Case Management for Anti-Money Laundering", Digital Harbor Solutions Anti-Money Laundering. pp. 1-4. Copyright 2006 Digital Harbor, Inc.

(Continued)

*Primary Examiner* — Ece Hur

(57) ABSTRACT

Various implementations are described herein for providing unified user experiences using data attributes and data models. By referencing structural information of data attributes included in data models, users are able to interact with and/or view related data stored in different databases. Contextual information for the different databases, data attributes, and data models provide a seamless unified user experience when running reports, scripts, web controls and so forth associated with the related data.

12 Claims, 5 Drawing Sheets

(56) References Cited

U.S. PATENT DOCUMENTS

| | | | |
|---|---|---|---|
| 2001/0027475 A1* | 10/2001 | Givol et al. | 709/204 |
| 2003/0074244 A1 | 4/2003 | Braxton | |
| 2003/0125929 A1* | 7/2003 | Bergstraesser et al. | 704/9 |
| 2003/0139837 A1* | 7/2003 | Marr | 700/110 |
| 2004/0041846 A1* | 3/2004 | Hurley et al. | 345/848 |
| 2005/0027586 A1 | 2/2005 | Bacon et al. | |
| 2005/0209943 A1* | 9/2005 | Ballow et al. | 705/35 |
| 2005/0289137 A1 | 12/2005 | Wu et al. | |
| 2006/0026122 A1 | 2/2006 | Hurwood et al. | |
| 2006/0241962 A1 | 10/2006 | Flora et al. | |
| 2007/0078555 A1* | 4/2007 | Dorgelo et al. | 700/108 |
| 2007/0276861 A1* | 11/2007 | Pryce et al. | 707/103 R |
| 2007/0294237 A1* | 12/2007 | John et al. | 707/4 |
| 2008/0002576 A1* | 1/2008 | Bugenhagen et al. | 370/229 |
| 2008/0279183 A1* | 11/2008 | Wiley et al. | 370/389 |
| 2009/0299791 A1* | 12/2009 | Blake et al. | 705/8 |

OTHER PUBLICATIONS

"Operational Performance Management: The New Imperative for Business Visibility", Celequest Webpage retrieved Jul. 21, 2007, available at: <http://www.marketingalchemist.com/CelequesCOPM_whiteyaper.pdf>, 7 pages.

"IBM—Discovery Warehouse from IBM and IOBS", Webpage retrieved Jul. 21, 2007, available at: <http://www-03.ibm.com/industries/healthcare/doclcontent/solution/9762571 05.html>, 2 pages.

* cited by examiner

UNIFIED USER EXPERIENCE USING CONTEXTUAL INFORMATION, DATA ATTRIBUTES AND DATA MODELS

BACKGROUND

System administrators responsible for managing information technology (IT) environments can face difficult tasks. Managing IT environments may involve monitoring and maintaining IT resources and assets such as client operating systems, databases, servers, client computing devices and so forth. Typically, operational data collected from the above mentioned resources and assets is stored in a live database. Configuration information, availability, and health status, are examples of operational data. System administrators view the operational data to monitor, troubleshoot, and optimize the IT environment. Over a period of time, the amount of operational data stored in the live database can become large (e.g. terabytes/gigabytes) and system administrators may find the data difficult to navigate.

Typically, the data stored in the live database is periodically transferred to a historical database. This allows the live database to maintain smaller amounts of data which allow system administrators to access the data easily and efficiently.

Historical data stored in the historical database includes archived live data collected over long periods of time. System administrators also use historical data for monitoring and troubleshooting IT environments. Although system administrators have access to historical data covering longer periods of time than the live data, the historical data may not include as much detailed information as the live data. The data stored in the historical database is usually consolidated, groomed, and optimized for storage and user access. This usually results in the loss of some detailed data. For example, live data collected for a client's CPU utilization may include over a thousand data points during a 24 hour time period. When the live data is transferred to the historical database, the average (or hourly average) of the data points may be stored in the historical database as opposed to storing all of the associated data points.

Typically, system administrators have interacted with live data and historical data using separate views into these live and historical databases (e.g., separate consoles or separate database sessions). In one scenario, a user would interact with live data using a first view. When the user wanted to interact with historical data, the user would manually provide information about the historical database and specify exactly what information the user wanted to view and/or interact with before a second view was created displaying the historical data.

In a similar scenario, a user would interact with historical data using a first view. When the user wanted to interact with live data, the user would provide contextual information about the live database and specify exactly what information the user wanted to view and/or interact with before a second view was created displaying the live data.

The user experience described in the above mentioned scenarios is inefficient and burdensome for users. As a result, it can be challenging for users to easily utilize data stored in a live database and a historical database in a meaningful manner for monitoring and troubleshooting IT environments.

SUMMARY

The following presents a simplified summary of subject matter discussed below. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are implementations for providing unified user experiences using contextual information, data attributes, and data models. Unified user experiences allow users to seamlessly interact with data stored in one or more databases. For example, unified user experiences allow users to seamlessly interact with data stored in a live database and related data stored in a historical database.

Seamless interaction with data stored in a live database and a historical database may be enabled using contextual information. For example, when a user is viewing live data and intends to interact with related historical data, contextual information associated with the historical database—such as a database name and location path—is used to access the historical database without requiring the user to provide such information. Other examples of contextual information are passwords or credentials to access a database, and the like. Contextual information may be included in one or more data attributes and/or maintained by an operations manager application, both discussed later.

Data attributes include descriptive information related to the data such as object type, data type, and so forth—information that can be used to interrelate data in a live database and a historical database. For example, live data related to bandwidth utilization of a monitored router may include "object type=router" and "data type=health". This can be used to automatically find related data with these attributes in a historical database.

Data attributes may also include contextual information such as the names of associated databases, location paths of the associated databases, and the like. For example, contextual information stored in data attributes can be used by an operations manager application, discussed later in greater detail, to interact with related data that may be stored in a different database. Note that interaction tools such as reports, scripts, web controls, and the like may be stored in data attributes. Further, data attributes are not limited to the above mentioned examples and may include other various types of descriptive information.

Data models can be provided to allow operation manager applications to determine which interaction tools are associated with various data attributes. A data model can model operational data in a way that includes both live and historical data. Data models may include structural information of one or more data attributes for live and historical data, relationship information corresponding to how the data attributes are related, and/or corresponding interaction tools such as reports, scripts, web controls, or the like associated with each data attribute. Data models may be implemented in a variety of ways including, but not limited to, database schemas, XML schemas, applications, web services, and the like.

Operation manager applications may use data attributes in conjunction with data models to determine which interaction tools (e.g., tools applicable to a database not currently being viewed) are available for users to select based on the data currently displayed and/or selected. Consider a scenario where a user is viewing historical data (from a historical database) related to error events of a monitored server. The historical data may include data attributes such as "object type=server" and "data type=error event". In one implementation, the operation manager application retrieves the object type and/or the data type of the displayed data, accesses a corresponding data model implemented as a database schema to lookup interactions tools associated with the "object type=server" and/or the "data type=error events" and displays the one or more interaction tools for a user to select. The one or more displayed interaction tools allow the user to interact with live data stored in a corresponding live database.

Interaction tools include logic for accessing and/or retrieving data stored in one or more databases, processing the data, and returning one or more results including the processed data for display. Note that processing the data may include, but is not limited to, analyzing and/or manipulating the data to facilitate the monitoring, troubleshooting, and/or optimizing of IT environments.

Interaction tools may also be stored in data models, or data attributes, or by operation manager applications, and so forth. Note that storing interaction tools in data attributes included in live data and historical data may result in increased storage requirements.

Many of the attendant features will be more readily appreciated as the same become better understood by reference to the following detailed description considered in connection with the accompanying drawings.

DETAILED DESCRIPTION

Overview

Figure 1:
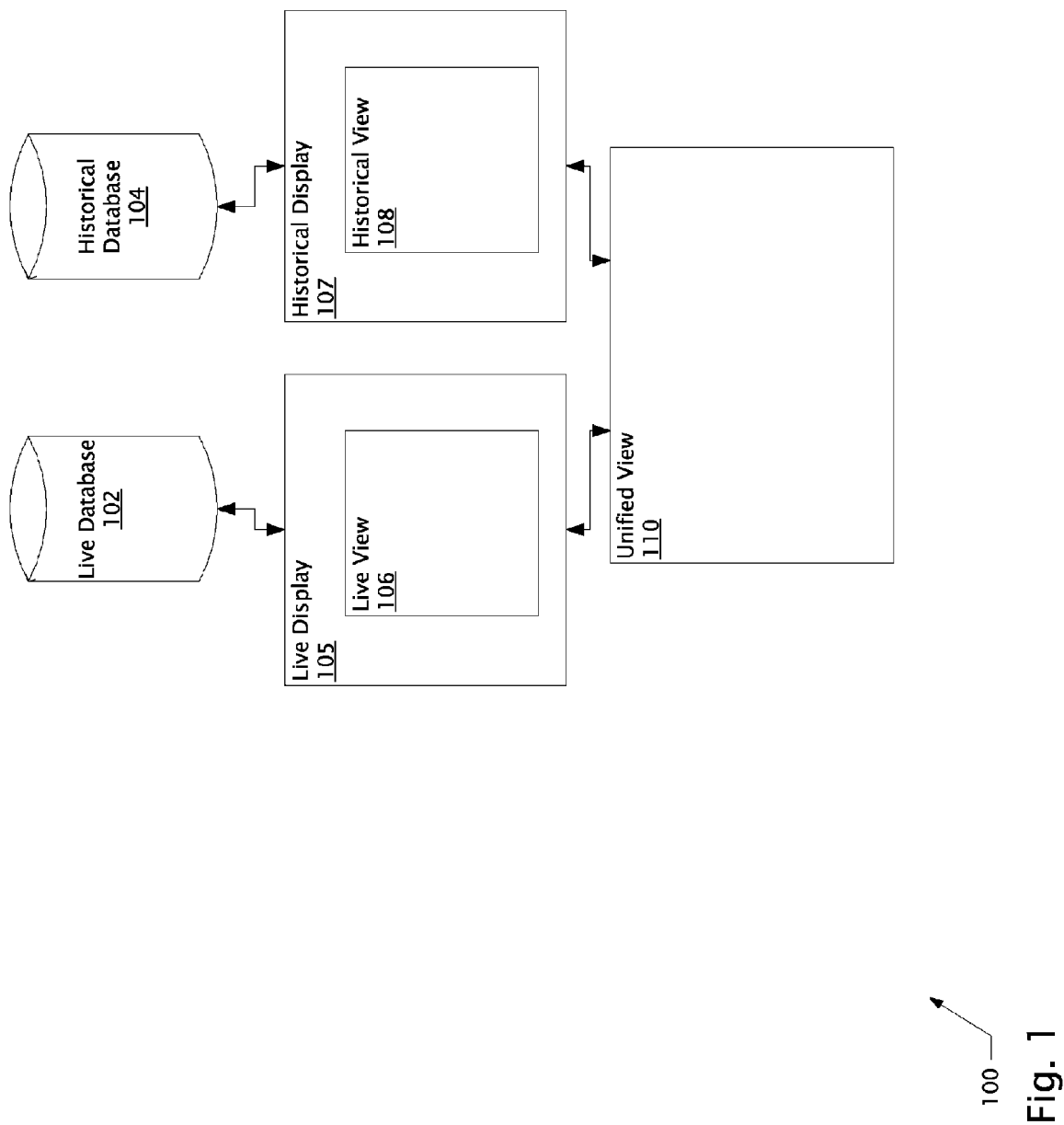
FIG. 1 illustrates an example interface for providing unified user experiences by allowing seamless interaction with interrelated live and historical data.

Operation manager applications provide unified user experiences for users by allowing users to seamlessly interact with related data stored in one or more databases using interaction tools such as reports, scripts, web controls and so forth. These applications display data from one or more databases corresponding to one or more monitored IT resources and assets such as computing devices, networking devices, printers, software applications, software services, and so forth. Users view the displayed data and are able to seamlessly interact with related data stored in one or more different databases in the same view via the interaction tools. Operation manager applications can be implemented as web applications, desktop applications, console applications, and the like.

Users of an operation manager application may select and/or view data stored in a live database to seamlessly interact with data stored in a historical database using the same view. Further, users may select and/or view data stored in a historical database to seamlessly interact with data stored in a live database using the same view.

To achieve seamless unified user experiences, operation manager applications may also provide contextual information to the interaction tools including, but not limited to, appropriate database names and location paths so that users do not have to provide the contextual information. As a result, users may not need to provide contextual information to interaction tools such as database names, location paths and the like since operation manager applications provide the contextual information. Note, as mentioned previously, contextual information may also be stored in data attributes and retrieved by operation manager applications when needed. Further, operation manager applications may store contextual information corresponding to displayed data and related data in a local text file, in RAM (random access memory), and so forth. It is not important how the contextual information is stored. Operation manager applications are able to access and retrieve contextual information without a user manually providing the contextual information.

Using the operation manager application, a user can utilize interaction tools such as reports, scripts, web controls, and so forth to interact with data associated with one or more monitored objects stored in one or more databases. The data associated with each monitored object includes one or more data attributes. A data model includes information about the structure of the corresponding one or more data attributes, relationships between the data attributes, and one or more interaction tools associated with each data attribute. By using data attributes corresponding to the selected and/or displayed data, the operation manager application displays the associated one or more interaction tools. Before an interaction tool accesses one or more databases, the operation manager application may use a context component that provides contextual information for accessing the one or more databases associated with the viewed and/or selected data so that users interacting with the data do not need to explicitly provide contextual information. For example, if the user is viewing live data stored in a live database and wants to view related historical data using the available interaction tools, the operation manager application provides the contextual information for the one or more databases that store the related historical data. Further, the operation manager application may provide the contextual information for the live database so that the interaction tool can access both the live database and the historical database to display relevant data in the same view.

When a user views and/or selects data corresponding to two or more different data attributes, the operation manager application uses a multiple selection component that includes logic for determining and displaying interaction tools that are in common between the different data attributes. For example, data attributes such as "object type=server" and "object type=printer" may share similar interaction tools that display data related to health. As a result, the multiple selection component determines which interaction tools are supported by both object types and displays the shared interaction tools to the user. Note that the operation manager application determines interaction tools that are associated with different data attributes and automatically displays interaction tools that are shared by the other data attributes.

Before interaction tools access one or more databases, users may be prompted to select parameters associated with the interaction tools that define a scope for the interaction tools. By specifying values for one or more parameters such as date, time and so forth, users can select boundaries for viewing and/or displaying data. For example, an interaction tool such as a script may include a parameter for selecting the color of the text for the displayed data results. Note that context and scope are different. Context refers to information for accessing data such as one or more database names, location paths, corresponding passwords and so forth. Scope refers to values for parameters associated with an interaction tool such as date, time color of text, and so forth that determine boundaries for the displayed data.

General Environment

Typically, separately interacting with and/or viewing live data stored in a live database and historical data stored in a historical database presents inefficient user experiences. Usually, live data in the live database is displayed in a first user interface and historical data stored in the historical database is displayed in a second user interface. These interfaces have not previously been integrated to provide a seamless data navigation experience. In FIG. 1, live data is stored in a live database 102 and historical data is stored in a historical database 104. Note that the live data includes, but is not limited to, recent or real time raw data such as data collected in the last week, day, hour, minute, and so forth. The historical data includes, but is not limited to, data archived from the live database. Further, the archived data may be consolidated, groomed, optimized for storage, arranged and indexed for querying, etc.

A user may display and/or interact with live data to obtain a view of corresponding historical data, or a user may display and/or interact with historical data to obtain a view of corresponding live data. In FIG. 1, a view of live data 106 is presented on a display 105 and a view of the historical data 108 is presented on a display 107. A display may be, but is not limited to, a television, a computer monitor, a projector, a cell phone screen, and the like.

Consider a scenario where a user viewing live data would like to view related historical data and a user viewing historical data would like to view related live data. Previously, if a user viewing live data in the live display 105 wanted to view related historical data, the user typically had to manually create a new display or view and manually access the historical database and view the related historical data separately from the live data. The user would have to manually enter the name of the historical database, the location path of the historical database, a password to access the historical database, and so forth. The user would also face the same situation for viewing related live data when initially viewing historical data in the historical display 107.

The earlier mentioned user experience is cumbersome and inefficient for users, especially if the user does not have the contextual information readily available. Further, a high level of knowledge about the architecture of either the historical database and/or the live database may be required to properly view related data in the different databases. For example, creating a report to view historical data while viewing related live data may not only require contextual information about the historical database, but may also require sophisticated database programming such as writing query commands based on detailed knowledge of the database architecture.

In FIG. 1, a unified view 110 is illustrated that provides interaction with and/or viewing of both the live and the historical data in a single view providing a unified user experience. Unified views include interaction tools such as reports, scripts and web controls, so users can obtain meaningful information derived from data stored in more than one database, such as data stored in a live database and related data stored in a historical database. For example, a user can view live data related to the configuration of a monitored database asset (a database other than the live or historical operational management databases) including data fields such as the current size of the database asset, who currently owns the database asset, the current security settings of the database asset, and the like. The corresponding data attributes may include "object type=database" and "data type=configuration settings". When the user selects an interaction tool associated with the displayed data (or such a tool is selected automatically), such as a report, the interaction tool is automatically provided with contextual information about both the live database and the historical database. The interaction tool may access and/or retrieve the historical data and the live data corresponding to the configuration settings of the database asset. Further, the interaction tool may process the data and return one or more results. The results may include the processed data and/or information derived from the processed data. For example, a user can see historical data detailing the size of the database over time, the various owners of the database over time, and how the security settings may have changed over time, and so forth. Note that the live data corresponding to each of the above mentioned fields may be displayed in conjunction with (side by side, or integrated) the historical data in the same view. Interrelated historical and live data, where possible, may even be combined into a single viewable dataset.

Another example might be a user viewing live data related to active alerts of a monitored email server regarding available disk space, percentage of mail box quotas near maximum capacity, percentage of attachments over the maximum file size, and the like. The corresponding data attributes may include "object type=email" and "data type=capacity alerts". The user can view live data related to the above mentioned fields for a particular email server and may interact with the historical data using interaction tools, such as a script. The script may retrieve the live data and the historical data corresponding to capacity alerts for the email server viewed by the user, process the retrieved data, and return one or more results for display. The one or more results may include the processed data and/or information derived from the processed data. The user can see historical data detailing the available disk space over time, percentage of mail box quotas near maximum capacity over time, percentage of attachments over the maximum file size over time, and so forth in conjunction with the corresponding live data. This provides a unified experience and allows the user to interact with live data and historical data in the same view.

Figure 2:
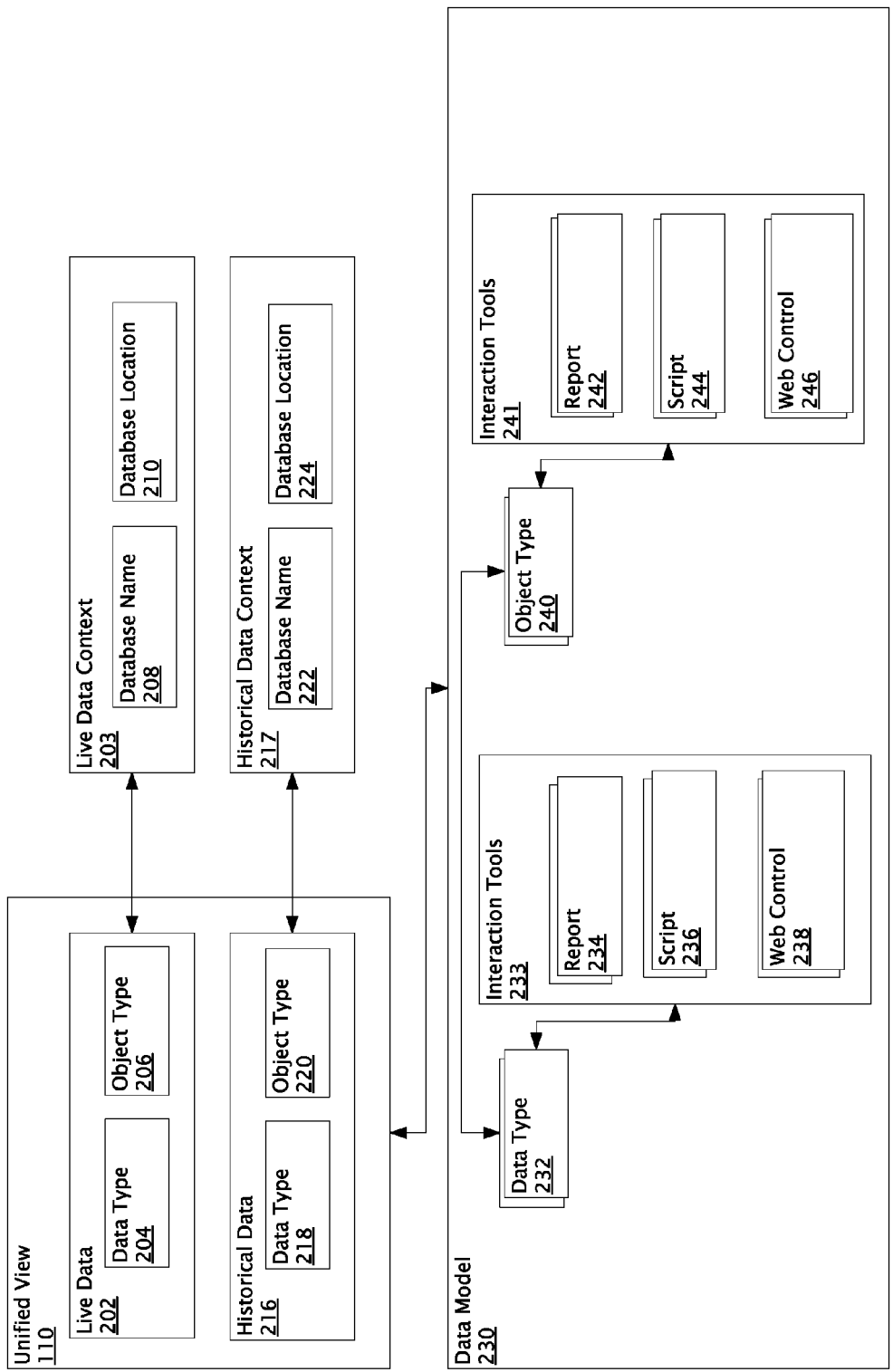
FIG. 2 illustrates an example implementation of data displayed to a user and interaction between the viewed and/or selected data and data models in providing unified user experiences.

In FIG. 1, users can interact with data in both the live database 102 and the historical database 104 seamlessly in the unified view 110, providing a meaningful unified experience. Contextual information associated with both the live database and historical database contribute to the unified experience by not requiring users to be knowledgeable of the contextual information of each database. The operation manager application may display both live data and historical data in the same view using interaction tools. Interaction tools are displayed (or automatically selected and executed) corresponding to data attributes of the data displayed and/or selected by a user. The operation manager application determines which interaction tools to display by using the data attributes of the displayed and/or selected data to access a corresponding data model. This can be achieved in a variety of ways, depending on the implementation of the data model. For example, the data model may be implemented in a database schema. The operation manager application may perform a look-up of the corresponding data attribute in the data model schema to determine the corresponding interaction tools and display them. In another example, the data model may be implemented as a web service. The operation manager application may send a request to the data model web service for the interaction tools associated with a specific data attribute. The data model web service processes the request and sends the associated interaction tools to the operation manager application. The operation manager application receives the interaction tools and displays them for the user to select. FIG. 2 illustrates in greater detail how unified user experiences can be facilitated when viewing live data stored in a live database and historical data stored in a historical database.

Unified User Experiences Viewing Live Data and Historical Data

FIG. 2 illustrates an example implementation of data displayed to a user and the interaction between data attributes and data models that provides unified user experiences. The implementation in FIG. 2 illustrates various aspects of interacting with live data and historical data in the same view. Not all of the elements illustrated in FIG. 2 are required in every embodiment and the various elements may be put together in different ways to implement different systems. FIG. 2 illustrates an example implementation 200 which includes the unified view 110 displaying both live data 202 and historical data 216 corresponding to the live database 102 and the historical database 104, respectively.

Data included in the unified view 110 includes data attributes. Data attributes include, but are not limited to, data types, or object types, and so forth. Examples of object types include IT resources and assets such as computing devices, email servers, databases, printers, or the like. Examples of data types include, but are not limited to, alerts, events, configuration settings, or health statuses. Further, detailed data types may include capacity alerts, security alerts, user events, system events, CPU health, disk health, and so forth.

Figure 3:
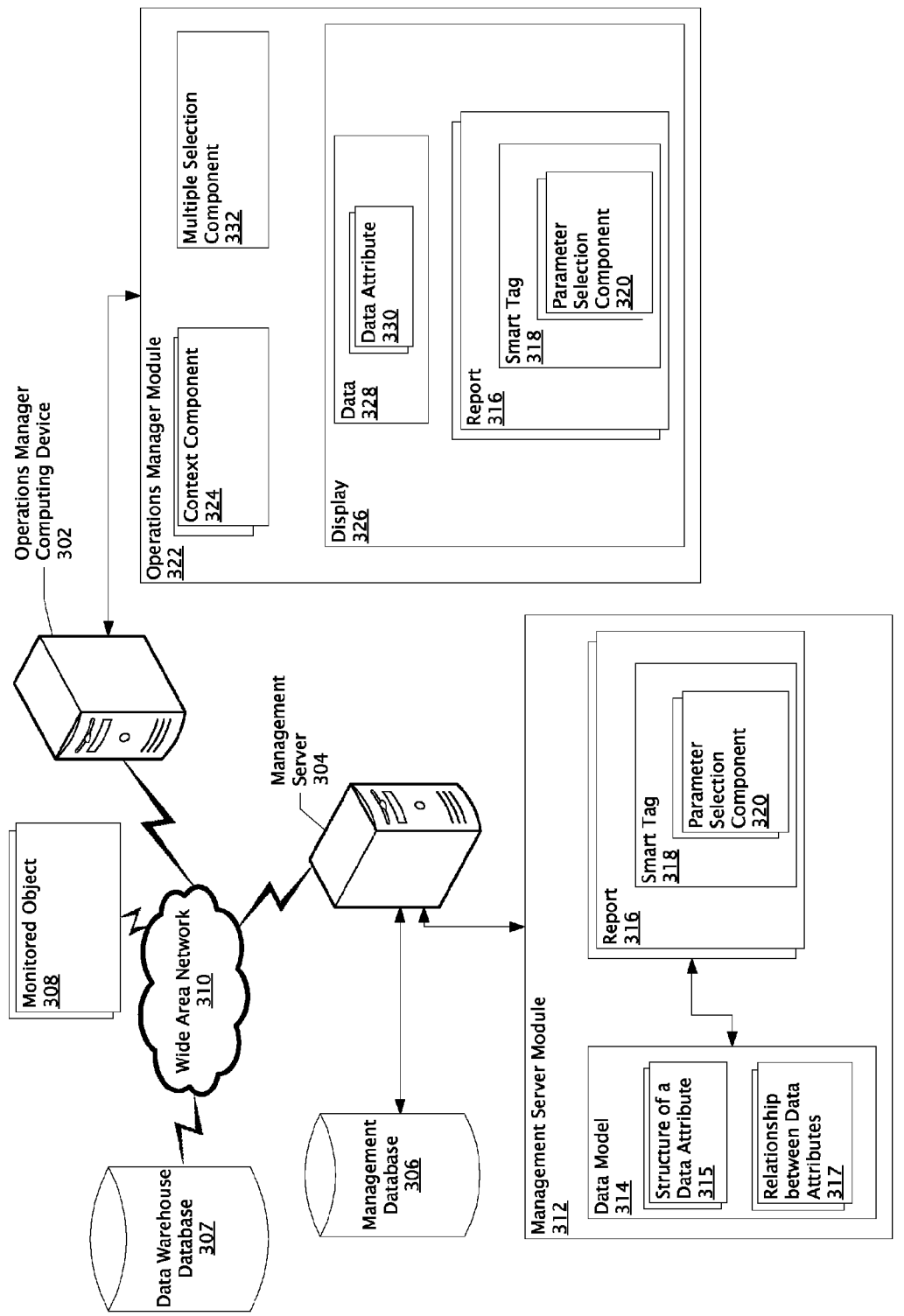
FIG. 3 illustrates an example environment for using contextual information, data attributes, and/or data models to provide unified user experiences.

The live data 202 is associated with a data type 204, an object type 206, and/or a live data context 203. The live data context 203 includes a database name 208 and a database location 210 of a database where the live data 202 is stored. The historical data 204 is associated with a data type 218, an object type 220, and a historical data context 217. The historical data context 217 includes a database name 222 and a database location 224 of a database where the historical data 216 is stored. Note that the live data context 203 and the historical data context 217 may be stored in data attributes or by an operation manager application, which is shown in FIG. 3. Further, the live data 202 and the historical data 204 may include any number of data attributes. It is not important how many data attributes are included in the data. Data attributes such as the data type 204, 218 and the object type 206, 220 may be displayed in the unified view 110 or the user may choose not to display them. It is not important that data attributes be displayed in user views but displaying data attributes may be helpful in interacting with both live data and historical data.

The data model 230 shown in FIG. 2 is for providing unified user experiences across live and historical operational data. The data model 230 includes a data type structure 232 and an object type structure 240. Corresponding to the data type structure 232 are one or more interaction tools 233. The interaction tools 233 include one or more reports 234, one or more scripts 236, and one or more web controls 238. Corresponding to the object type structure 240 are one or more interaction tools 241. The interaction tools 241 include reports 242, one or more scripts 244, and one or more web controls 246. When users view and/or select live data 202, associated data attributes such as data type 204 and object 206 are used to provide unified user experiences by accessing the appropriate data attribute structure included in the data model 230. The data model 230 is used to reference the corresponding data type 232 and/or the corresponding object type 240 to provide structural information about the data attributes and additional information such as the interaction tools 233, 241. The discussion of FIG. 3 below will provide more detail on how data attributes and data models are used to provide unified experiences.

Live Database and Historical Database Implementation

General Environment

FIG. 3 illustrates an example implementation in the context of FIG. 2 of an individual using an operations manager module 322 to provide unified user experiences using reports. The implementation in FIG. 3 uses reports to illustrate an aspect of unified user experiences but is not limited to reports and may include other various interaction tools such as scripts, web controls, and so forth. These tools may be executed automatically in response to user interaction with live (or historical) data or may be executed after being displayed per interaction with live (or historical) data and selected by the user. Not all of the elements illustrated in FIG. 3 are required in every embodiment and the various elements may be put together in different ways to implement different systems. FIG. 3 illustrates an example environment 300 which includes an operations manager computing device 302 and a management server 304 operatively connected via a wide area network 310. The operations manager computing device 302 is running the operations manager module 322. The management server 304 is running a management server module 312. Note the wide area network 310 may include a local area network, a wireless network, a point-to-point connection, the Internet, and the like.

Environment 300 also includes a management database 306 and a data warehouse database 307 that are accessible by the operations manager module 322. The management database 306 and the data warehouse database 307 are operatively connected to the wide area network 310.

The management database 306 stores live data, such as the live data 202, and the data warehouse database 307 stores historical data, such as the historical data 216. One or more monitored objects 308 provide the live data stored in the management database 306 and the historical data stored in the data warehouse database 307. The monitored object 308 may be, for example, a client computing device, a server, a software application, a printer, a web service, and so forth.

Data Associated With Monitored Objects

In FIG. 3, the management database 306 and the data warehouse database 307 store data collected from the monitored object 308. The types of databases for use in storing data associated with monitored objects include, but are not limited to, relational databases, object oriented databases, flat file databases, and so forth. In FIG. 3, the management database 306 and the data warehouse database 307 are relational databases. Examples of relational database products are Microsoft SQL™, Microsoft Access™, Oracle™, My SQL™ and so forth. Any type of database or data store can be used to store data.

Data corresponding to the monitored object 308 stored in the management database 306 and the data warehouse database 307 can be collected in a variety of ways. For example, monitored objects can push their operational data to databases and/or servers may pull operational data from the monitored objects and store the data to databases. In FIG. 3, the monitored object 308 supports either pushing data to the management database 306 or having data pulled by the management server 304 for storage in the management database 306. It is also possible to have an IT environment where some monitored objects push data to a database and other monitored objects have data pulled and stored in the database. It is not important how data associated with monitored objects is collected by databases.

Data Collected

Data collected may be, for example, information about events, alerts, health status, and so forth associated with monitored IT resources and assets.

For example, collected data for events associated with a monitored operating system running on a client computing device may include information such as when a user attempts to modify the registry of the operating system, when the user attempts to modify security settings, when the user attempts to access restricted files, and so forth.

Examples of collected data for alerts associated with a monitored router may include information such as when the router receives too many requests for DHCP connections, when the router loses connection to the Internet, when access to configuration settings are requested, when configuration settings are modified, and so forth.

Examples of collected data for health status associated with a monitored client computing device may include information such as the available capacity of a local hard drive, the CPU utilization of one or more local processors, the date of the latest software update for a local firewall software application running on the client computing device, and so forth.

Note that the data collected and stored in the management database 306 and the data warehouse database 307 is not limited to the above mentioned examples of events, alerts, and health status, and may include other various types of collected operational information that may assist in the monitoring, troubleshooting, and/or optimizing of IT environments including IT resources and assets.

In FIG. 3, data 328 corresponds to the monitored object 308. Furthermore, the operation manager module 322 displays the data 328 using a display 326.

Data Attributes

Data associated with monitored objects may have data attributes. Data attributes may include, but are not limited to, object type, or data type, and so forth. Object types may include, but are not limited to, computing devices, operating systems, software applications, and the like. For example, a monitored object could be an email server. The object type could be email server. Note that multiple object types may be included for a monitored object. The email server object could have object types such as server, mail server, and so forth.

Data types may include, but are not limited to, events, alerts, status, configuration information, and the like. Data types may be associated with the types of collected data stored in the management database 306 and the data warehouse database 307. For example, CPU utilization of one or more processors of a monitored computing device may be collected. The data type for the collected and stored CPU utilization data may be "performance". The CPU utilization data may also include more than one data type such as status, power usage, and so forth.

Other examples of data attributes include, but are not limited to, interaction tools, location paths of database where related data is stored, and so forth. Note that in FIG. 3, one or more reports 316 that are associated with the displayed data 328 are received from the data model 114. But, as described in FIG. 2, the one or more reports 116 may also be stored in data attributes for reference by the operations manager module 322.

Both live data and historical data can be displayed to users in a variety of ways to facilitate interaction between the user and the data, including but not limited to, tabular views, matrix views, forms, customized web pages and the like. Note that the live data includes recently collected data and the historical data includes consolidated, groomed and optimized archived live data. Typically, data is displayed in a tabular format including rows and columns. The columns displayed may correspond to the data attributes associated with the data. The rows correspond to the data from the monitored objects.

Both the live data and the historical data may be sorted by the data attribute data type. For example, a user can view the historical data sorted by a data attribute such as data type. If the selected data type is "event", the historical data can be sorted by the data type "event". Further, the user can sort the historical data using both data type and object type, such as data type "alert" and object type "router".

Data Model Corresponding to Data Attributes

Data models corresponding to data attributes provide additional information for interacting with live data stored in the management database 306 and the historical data stored in the data warehouse database 307. Facilitating in providing a unified user experience, data models include structural information of the data attributes and the relationship between data attributes. In FIG. 3, a data model 314 includes one or more structures of data attributes 315 and one or more relationships between data attributes 317.

Using one or more data attributes 330, the operation manager module running on the operation manger computing device uses the data attribute 330 to access the data model 314 to determine which one or more reports 316 are associated with the data attribute 330, and display the appropriate report 316 in the display 326 for users to select. For example, if a user is viewing live data related to a computing device on a network, the live data may be displayed in rows and columns and grouped by data type "event". The reports displayed in the display 326 are determined by referencing the one or more reports 316 that are associated with the data type "events" included in the data model 314. The report 316 includes logic for accessing and/or retrieving related data stored in one or databases, processing the data, and displaying one or more results. Another example of a data attribute that may determine the reports available is object type. For example, reports may be displayed that correspond to specific monitored object type "server". In FIG. 3, the operations manager module 322 uses a data attribute 330 to access the data model 314 to provide a unified user experience using the one or more reports 316.

Data models can be implemented in a variety of ways including, but not limited to, database schemas, XML schemas, applications, and the like. Examples of data models implemented using XML schemas include Microsoft Management Packs™ for Microsoft Operations Manager™. It is not important how the data model corresponding to the data is implemented. The operations manager module needs only to access the data model to determine the corresponding interaction tools such as reports that are available for the data viewed and/or selected. The interaction tools are displayed for a user to select (or they may be automatically selected, per pre-configured user preferences, for example). The selection of the interaction tool(s) allows the user to seamlessly interact with the live data and historical data stored in the management database 306 and the data warehouse database 307, respectively.

Reports may be displayed for users to select. Note that the reports do not necessarily need to be included in the data model and may be included in a separate component (not shown) or a web service (not shown). Further, the data model could be stored in the operations manager module 322 and not in the management server module 312.

Reports

Reports may be used to provide a unified user experience via the display 326 of the operation manager module 322. Typically, reports include syntax stored in a text file, in an XML file, in RAM, and so forth, and they are located on the operations manager device 302 or accessible on a network device (not shown) via the wide area network 110. For example, a report for accessing an SQL database may include commands such as SELECT, JOIN, WHERE, GROUP BY, and so forth. It is not important how reports are implemented. Reports are able to access and/or retrieve stored data, process the data, and display one or more results for a user to interact with and/or view.

Reports received from the data model 314 may include a smart tag having one or more controls for specifying values for one or more parameters. In FIG. 3, the report 116 includes a smart tag 318. The smart tag 318 includes one or more parameter selection controls 320 that users may interact with to specify values for the report 116.

Consider a scenario where a user is presented with a list of available reports corresponding to data (live or historical) viewed and/or selected by a user. The user may want to see information provided by the report for the last week. The smart tag 318 may include a parameter selection control 320 that presents the user with a user interface (UI) via the display 326 for selecting parameters for desired dates and times to run the report 116 on the data. In FIG. 3, the parameter selection control 320 is displayed in the display 326 for the user to specify values for the parameters. Smart tags allow users to provide scope for reports. To the user, it appears seamless since the user did not have to provide contextual information nor select which parameters to specify for running the report. The appropriate parameters have already been selected and users define a scope by specifying values for the parameters. Examples of reports using smart parameters include reports included in Microsoft Management Packs™ for Microsoft Operations Manager™. Note that smart tags are customizable and can be modified by users. Users are not prevented from adding other parameters to the report before running the report 116. For example, the user may modify the associated report 116 to include other parameters not originally included in the smart tag. Note that automatically executed reports may or may not require user interaction to enter parameter values. User configuration settings may automatically supply parameter values if they are needed.

As mentioned previously, reports may also execute against one or more databases. For example, in an implementation where live data is stored in the management database 306 and historical data is stored in the data warehouse database 307, it might be relevant to execute a report using data in both databases. In FIG. 1, reports may be run on data included in both the management database 306 and the data warehouse database 307.

Operation Manager Module

Operations manager module 322 displays data associated with the one or more monitored objects 308. In FIG. 3, the operations manager module 322 displays the data 328 using the display 326.

Operations manager modules may also provide contextual information to reports so that users do not need to specify the contextual information before running the report. In FIG. 3, the operations manager module 322 includes a context component 324. The context component 324 includes, but is not limited to, information such as a corresponding database name, a location path of the database for the report to run on, a password to access the database, and so forth. Note that contextual information provided by operations manager modules may also be provided by data attributes associated with the data being displayed. In this manner, operations manager modules reference data attributes that include contextual information and provide the contextual information seamlessly to any reports run by users.

When users run reports, operations manager modules also display parameter selection components included in smart tags associated with the reports. In FIG. 3, the report 316 includes the smart tag 318 that includes one or more parameter selection components 320 for display by the operations manager module 322. Users interact with parameter selection components to specify values for the parameters that make the contextual reports more meaningful to the users. Note that smart tags may be included in data attributes, separate from the reports.

Parameter selection components may also receive information specifying parameter selection from operations manager modules, without users providing the information. For example, if an individual is viewing data for a particular time frame, the operations manager module may include the time frame of currently viewed data in the context component 324. When the user runs a report and a smart tag is included for time, the operations manager may provide the time frame information seamlessly to the report. As a result, the report runs using the provided contextual information and returns results for the user to view corresponding to the currently viewed time frame.

The results of the report may include the live data stored in the management database 306 and the historical data stored in the data warehouse database 307. For example, in FIG. 2, both the live data 202 and the historical data 216 are displayed to the user. The user is able to interact with both the live data and the historical data stored in different databases seamlessly and efficiently using a single view, the display 326. By using contextual information, data attributes, data models, the operations manager module displays interaction tools to the user for interacting with the live data and the historical data seamlessly and effortlessly. In FIG. 3, the interaction tools are the one or more reports 316.

Multiple Selection Components

Multiple selection components may be included in operations manager modules for determining common interaction tools supported by two or more viewed and/or selected data having different data attributes such as different object types and/or data types.

Consider a scenario where a user views and/or selects data having different data attributes such as different data types (e.g. a device and a service). The corresponding interaction tools, such as reports associated with each different data type may be different. Multiple selection components include logic for determining which interaction tools are in common between the two or more different data types. In FIG. 3, the operations manager module 322 includes a multiple selection component 332 for determining common reports between different object types and/or data types. Note that the multiple selection component 332 could be implemented in the management server module 312. As a result, the operations manager module 322 would receive and display the reports common to the different data attributes. Further, multiple selection components may be implemented in a web service (not shown) for access by the operations manager module 322 and/or the management server module 312.

Figure 4:
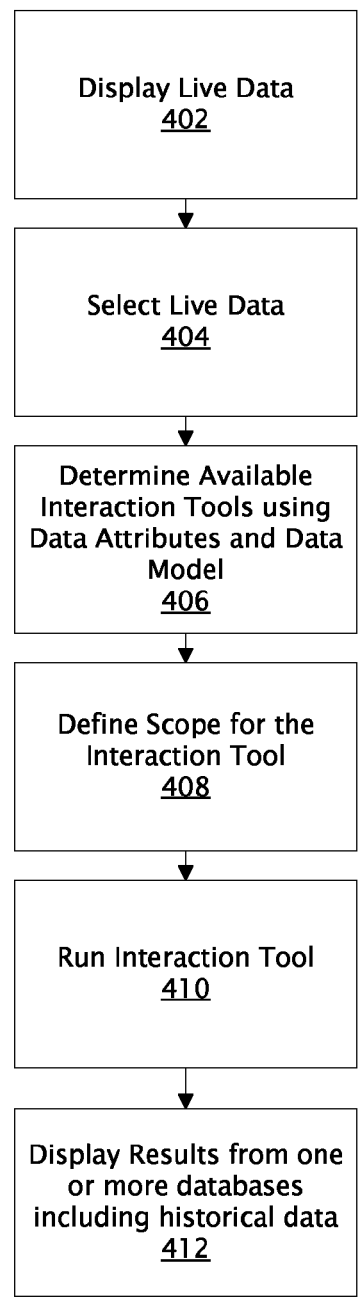
FIG. 4 shows an example flow chart depicting an example implementation for providing unified user experiences viewing live data and accessing related historical data stored in a different database.

Unified User Experience Viewing Live Data and Interacting with Related Historical Data in the Same View FIG. 4 is a flow chart 400 depicting an example in the context of FIG. 3 of providing unified user experiences using interaction tools such as reports, scripts, web controls, and the like. The flow chart 400 depicts only one example of an implementation for providing unified user experiences, and is not intended to limit the examples described in this application to this particular implementation.

Consider a scenario where a user is viewing live data stored in the management database 306 and wants to view or interact with historical data related to the live data stored in the data warehouse database 307. Furthermore, the user does not have any knowledge of contextual information about the data warehouse database 307, has no knowledge of the architecture of the data warehouse database 307, has little knowledge of database programming, or does not understand the data model 314.

At block 402, live data stored in the management database 306 is displayed to the user on the display 326. Note that in another scenario, the user could be viewing data stored in the data warehouse database 307. This scenario is described below in FIG. 5.

At block 404, specific data included in the displayed live data is selected by the user. Typically, users select data they are interested in viewing in detail (e.g. an alarm of a router, alerts of a service, etc.).

At block 406, available interaction tools are determined that are associated with the selected live data, such as reports, scripts, web controls, and so forth. When the user selects the specific data, the operations manager module 322 uses data attributes associated with the selected data to access the data model 314 to display corresponding interaction tools such as reports, scripts, web controls, and so forth. The interaction between the operations manager module 322 and the data model 314 may vary depending on the implementation of the data model 314. As discussed previously, the data model 314 may be implemented as a database schema, an XML schema, a web service, and so forth. After accessing the data model 314 and receiving the appropriate interaction tools such as the one or more reports 316 associated with referenced data attributes, the operations manager module 322 displays the interaction tools that are associated with the data attribute 330 of the selected live data.

At block 408, the user is presented with the one or more parameter selection controls 320 to determine a scope for the displayed interaction tools, such as the one or more reports 316. The one or more reports 316 include the parameter selection component 320. Before the report 316 runs, the display 326 displays the parameter selection component 320 for the user to specify values for the parameters, thus providing a scope for the report.

At block 410, the report 316 is run using the context component 324. Note the user does not have to provide contextual information nor determine which specific parameters are relevant. The operations manager module provides the information based on the context component 324 and the current view of the displayed live data, also included in the context component 324. The context component 324 is used to determine the name and location of the data warehouse database 307 where the related historical data is stored.

At block 412, the results of the report 116 are displayed on the display 326. The results may include processed data from both the management database 306 and the data warehouse database 307.

Although reports are used to describe unified user experiences in FIG. 3 and FIG. 4, unified user experiences are not limited using reports and may include scripts, web controls and so forth.

Users seamlessly interact with related data located on different databases without having specific knowledge about contextual information, database architecture, and database programming.

Figure 5:
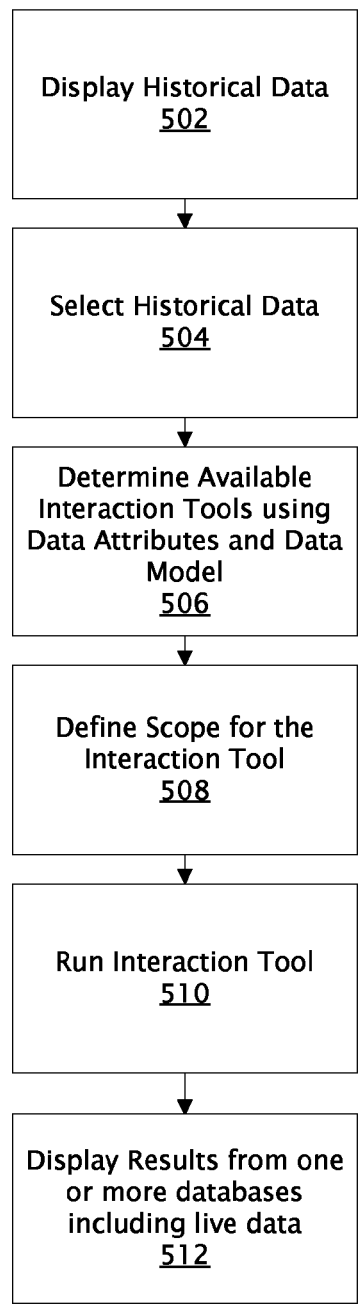
FIG. 5 shows an example flow chart depicting an example implementation for providing unified user experiences viewing historical data and accessing related live data stored in a different database.

Unified User Experience Viewing Historical Data and Interacting with Related Live Data in the Same View FIG. 5 is a flow chart 500 depicting an example in the context of FIG. 3 of providing unified user experiences using interaction tools such as reports, scripts, web controls, and the like. The flow chart 500 depicts only one example of an implementation for providing unified user experiences, and is not intended to limit the examples described in this application to this particular implementation.

Consider a scenario where a user is viewing historical data stored in the data warehouse database 307 and wants to interact with live data related to the historical data stored in the management database 306. Further, the user does not have any knowledge of contextual information about the management database 306, knowledge of the architecture of the management database 306, has little to no knowledge of database programming, and does not understand the data model 314.

At block 502, historical data stored in the data warehouse database 307 is displayed to the user on the display 326.

At block 504, specific data included in the displayed historical data is selected by the user. Typically, users select data they are interested in viewing in detail (e.g. an alarm of a router, alerts of a service, etc.).

At block 506, available interaction tools are determined that are associated with the selected historical data, such as reports, scripts, web controls, and so forth. When the user selects the specific data, the operations manager module 322 uses data attributes associated with the selected data to access the data model 314 to display corresponding interaction tools such as reports, scripts, web controls, and so forth. The interaction between the operations manager module 322 and the data model 314 may vary depending on the implementation of the data model 314. As discussed previously, the data model 314 may be implemented as a database schema, an XML schema, a web service, and so forth. After accessing the data model 314 and receiving the appropriate interaction tools such as the one or more reports 316 associated with referenced data attributes, the operations manager module 322 displays the interaction tools that are associated with the data attribute 330 of the selected historical data.

At block 508, the user is presented with the one or more parameter selection controls 320 to determine a scope for the displayed interaction tools, such as the one or more reports 316. The one or more reports 316 include the parameter selection component 320. Before the report 316 runs, the display 326 displays the parameter selection component 320 for the user to specify values for the parameters, thus providing a scope for the report.

At block 510, the report 116 is run using the context component 324. Note the user does not have to provide contextual information nor determine which specific parameters are relevant. The operations manager module provides the information based on the context component 324 and the current view of the displayed historical data, also included in the context component 324. The context component 324 is used to determine the name and location of the management database 306 where the related live data is stored.

At block 512, the results of the report are displayed on the display 326. The results may include processed data from both the management database 306 and the data warehouse database 307.

Although reports are used to describe unified user experiences in FIG. 3 and FIG. 5, unified user experiences are not limited using reports and may include scripts, web controls and so forth.

Users seamlessly interact with related data located on different databases without having specific knowledge about contextual information, database architecture, and database programming.

Conclusion

Embodiments and features discussed above can be realized in the form of information stored in volatile or non-volatile computer or device readable media. This is deemed to include at least media such as optical storage (e.g., CD-ROM), magnetic media, flash ROM, or any past or future means of storing digital information. The stored information can be in the form of machine executable instructions (e.g., compiled executable binary code), source code, bytecode, or any other encoded information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed, individually or in combination, on any type of computing device, including portable devices, workstations, servers, mobile wireless devices, and so on.

Although some particular implementations of systems and methods have been illustrated in the accompanying drawings and described in the foregoing Detailed Description, it will be understood that the systems and methods shown and described could be stored on computer readable media for implementing the aforementioned systems and methods. Further the systems and methods shown are not limited to the particular implementation described, but are capable of numerous rearrangements, modifications and substitutions without departing from the spirit set forth and defined by the following claims.

What is claimed is:

1. A method for providing a unified user experience, comprising: displaying data on a display, the displayed data corresponding to a monitored object of an information technology (IT) environment and stored in a first database that stores non-archived operational data associated with the monitored object for managing, maintaining and optimizing operational data by a system administrator of the IT environment;
in response to a user selecting a first data from the displayed data, the first data including a first data attribute, accessing a data model associated with the first data, the data model storing different sets of interaction tools in association with different data attributes and comprising a structural representation of the first data attribute and one or more interaction tools associated with the first data attribute, the first data attribute including one or more of an object type and a data type, the object type specifying a type of IT resource or asset and the data type specifying a type of collected data stored in the first database;
identifying one or more common interaction tools among at the one or more interaction tools associated with the first data attribute and one or more interaction tools associated with different data attributes included in the first data;
displaying the one or more common interaction tools for selection by a user;
displaying one or more parameter selection controls configured to control one or more parameters of the one or more displayed interaction tools to control a respective scope of the one or more displayed interaction tools;
in response to receiving a user selection of one of the one or more displayed interaction tools and user specified values for the one or more parameters, the selected interaction tool comprising a report, a script, or a web control, the selected interaction tool automatically:
obtaining contextual information from a second data attribute associated with the first data, the contextual information including at least a database name and a location path associated with a second database that stores archived operational data associated with the monitored object;
accessing a second data associated with the second data attribute and stored in the second database;
processing the first data and the second data to obtain a result; and
returning the result; and displaying the result.

2. The method of claim 1, wherein the report includes a smart tag, the smart tag having at least one control for providing one or more values for at least one parameter associated with the report.

3. The method of claim 2, further comprising specifying the one or more values of the at least one parameter associated with the report.

4. A computer readable storage device storing instructions that, when executed by a computer, cause the computer to perform operations, the operations comprising:
displaying data stored in a first database that stores non-archived operational data for managing, maintaining and optimizing operational data by a system administrator of an information technology (IT) environment, the data corresponding to a monitored object of the IT environment;
in response to a user selecting a first data that includes a first data attribute and one or more different data attributes from the displayed data, accessing a data model associated with the selected first data, the data model storing different sets of interaction tools in association with different data attributes and including a structural representation of the first data attribute and the one or more different data attributes and one or more interaction tools associated with the first data attribute and the one or more different data attributes, each data attribute including one or more of an object type and a data type, the object type specifying a type of IT resource or asset and the data type specifying a type of collected data stored in the first database;
determining the one or more interaction tools associated with the first data attribute and the one or more different data attributes from the data model, the determining including determining if there is at least one common interaction tool among the one or more interaction tools associated with the first data attribute and the one or more different data attributes;
in response to receiving a user or automatic selection of an interaction tool from the one or more interaction tools, the selected interaction tool comprising a report, a script, or a web control, the selected interaction tool automatically:
obtaining contextual information from a second data attribute associated with the selected first data, the contextual information including at least a database name and a location path associated with a second database that stores archived operational data associated with the monitored object;
accessing a second data associated with the second data attribute and stored in the second database;
processing the selected first data and the second data to generate a result; and
returning the result; and displaying the result generated by the selected interaction tool.

5. The computer readable storage device of claim 4, wherein the operations further comprise displaying the one or more interaction tools for selection by the user.

6. A system for providing a unified user experience comprising: one or more objects of an information technology (IT) environment monitored via a network for managing, maintaining and optimizing operational data by a system administrator of the IT environment;

a first database including live operational data collected from the one or more monitored objects;

a second database including historical operational data, the historical operational data including consolidated live operational data associated with the one or more monitored objects;

a computing device including a display for displaying the live operational data and the historical operational data, the live operational data and the historical operational data each including at least one data attribute, each data attribute including one or more of an object type and a data type, the object type specifying a type of IT resource or asset and the data type specifying a type of collected data stored in the first and second databases;

a first module configured to include a data model comprising:

a structural representation of each of a plurality of data attributes for the live operational data and the historical operational data; and at least one tool associated with each one of the plurality of data attributes, at least a first one of the plurality of data attributes being associated with a different tool than a second one of the plurality of data attributes in the data model;

the computing device configured to, in response to a user selecting a first data from the displayed live operational data, access the data model to determine a tool that is from the at least one tool associated with the first data attribute associated with the first data, the determined tool comprising a report, a script or a web control, the determined tool for automatically:

accessing the first data stored in the first database;

obtaining contextual information from a second data attribute associated with the first data, the contextual information including at least a database name and a location path associated with the second database;

accessing a second data associated with the second data attribute and stored in the second database;

processing the first data and the second data to obtain a result; and returning the result;

the computing device further configured to display the result based on the determined tool;

a second module configured to include a multiple selection component configured to determine one or more common tools associated with data corresponding to two or more different data attributes; and the computing device further configured to, in response to the user selecting two or more data corresponding to two or more different data attributes, determine a tool common to the two or more different data attributes and obtain the result based on the determined common tool.

7. The system of claim 6, wherein the report includes a smart tag, the smart tag having at least one control for providing one or more values for at least one parameter associated with the report.

8. The system of claim 7, further comprising a multiple selection component for determining one or more common reports associated with the data corresponding to two or more different data attributes.

9. The system of claim 6, wherein the computing device is configured to receive the determined tool and display the determined tool for selection.

10. The system of claim 6, wherein the data type includes an event, an alert, a configuration setting, or a health status.

11. The system of claim 6, wherein the computing device is further configured to execute the first module.

12. The system of claim 6, wherein the data model includes information describing a relationship between the one or more data attributes.

\* \* \* \* \*